(12) United States Patent  
Leman

(10) Patent No.: US 6,266,235 B1  
(45) Date of Patent: Jul. 24, 2001

(54) METHOD FOR SECURING A LAPTOP COMPUTER

(75) Inventor: Michael V. Leman, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/167,635

(22) Filed: Oct. 6, 1998

(51) Int. Cl.[7] ........................................................ G06F 1/16
(52) U.S. Cl. ..................... 361/681; 361/679; 361/680; 361/682; 361/683; 361/684; 361/685; 361/686
(58) Field of Search ..................... 361/679–686; 292/179, 150, 106, 102, 129; 312/223.1, 194, 195, 263; 248/917

(56) References Cited

U.S. PATENT DOCUMENTS

| D. 430,870 | 9/2000 | Maruyama et al. . |
| 5,193,069 | * 3/1993 | Furuya .................................. 364/708 |
| 5,239,444 | * 8/1993 | Sasaki .................................. 361/728 |
| 5,345,403 | 9/1994 | Ogawa et al. . |
| 5,465,191 | 11/1995 | Nomura et al. . |
| 5,497,296 | 3/1996 | Satou et al. . |
| 5,576,929 | 11/1996 | Uchiyama et al. . |
| 5,644,469 | * 7/1997 | Shioya et al. ........................ 361/681 |
| 5,742,475 | 4/1998 | Riddiford . |
| 5,777,704 | * 7/1998 | Selker .................................... 349/58 |
| 6,016,171 | 1/2000 | Tsao . |
| 6,122,152 | 9/2000 | Goto et al. . |
| 6,125,040 | 9/2000 | Nobuchi et al. . |

OTHER PUBLICATIONS

Catalog Item "New Dell® Latitude® CPi," Dell® Business Catalog, Jul. 1998, pp. 14–15.

* cited by examiner

*Primary Examiner*—Leo P. Picard  
*Assistant Examiner*—Yean-Hsi Chang  
(74) *Attorney, Agent, or Firm*—Perkins Coie LLP

(57) ABSTRACT

A method for operating a display housing relative to a base of a laptop computer. In one embodiment, the method can include stowing the display housing by folding the display housing toward the base such that an overhanging portion of the display housing extends beyond an edge of the base. The method can further include releasably securing the overhanging portion of the display housing to the base and releasing the overhanging portion of the display housing from the base. In one embodiment, the display housing can be secured to the base by rotating a latch relative to the display housing or the base. In another embodiment, the overhanging portion of the display can be secured to the base by translating the latch relative to the display to disengage the latch member from the base.

26 Claims, 8 Drawing Sheets

METHOD FOR SECURING A LAPTOP COMPUTER

TECHNICAL FIELD

The present invention is directed to a method for securing a display housing to a base of a laptop computer.

BACKGROUND OF THE INVENTION

Laptop computers are portable computers that generally operate from either external or portable power sources. Conventional laptop computers typically have a base pivotally connected to a display housing. The base typically includes a primary input device, such as a keyboard, and a secondary input device, such as a computer mouse, roller ball or touch pad. The display housing typically includes a liquid crystal display (LCD) or other type of display. To access the keyboard and the display, a user positions the base on a surface (e.g., the user's lap or a fixed surface) and opens the computer by pivoting the display housing away from the base. To close and easily transport the computer after use, the user pivots the display housing toward the base and secures the housing to the base.

In conventional laptop computers, the display housing is generally relatively small so that the laptop computer can be easily transported. One drawback with this arrangement is that text and graphics on the display may be difficult to visually discern. Accordingly, it may be difficult to use the laptop computer.

One means for addressing this drawback is to enlarge the size of the display housing while keeping the size of the base approximately the same. Accordingly, the display can be made larger and easier to read without unnecessarily increasing the weight of the computer by also increasing the size of the base. However, one drawback with this approach is that it may be difficult to latch or otherwise secure the oversized display housing to the base. For example, it may be difficult to latch a display that overhangs the base without using a relatively complex mechanism that can be cumbersome and/or heavy. Another drawback is that the portion of the oversized display that overhangs the base may be exposed even when the laptop computer is closed. Accordingly, the display may be susceptible to damage when the laptop computer is transported.

SUMMARY OF THE INVENTION

The present invention is directed toward methods for operating a display housing relative to a base of a laptop computer. In one aspect of the invention, the method includes stowing the display housing by folding the display housing toward the base to extend an overhanging portion of the display housing beyond an edge of the base, and releasably securing the overhanging portion of the display housing to the base. The method can further include releasing the overhanging portion of the display housing from the base and folding the display housing away from the base to access a display of the display housing.

The overhanging portion of the display housing can be secured to the base according to one or more of several methods. For example, in one aspect of the invention the overhanging portion of the display housing can be secured to the base by rotating a latch member of one of the base and the display housing to engage the latch member with a corresponding protrusion of the other of the base and the display housing. In another aspect of the invention, securing the overhanging portion of the display housing from the base can include translating a latch member relative to the display housing to engage the latch member with the base. In still a further aspect of the invention, the display housing can be released from the base by depressing a latch member inwardly from a surface of the display housing to disengage the latch member from the base.

DETAILED DESCRIPTION OF THE INVENTION

The present disclosure describes laptop computers having an oversized display housing releasably secured to a base. In one embodiment, the display housing can include a latch that slides relative to the display housing to secure the display housing to the base. In another embodiment, the display housing can include a latch that pivots to secure the display housing to the base. Many specific details of certain embodiments of the invention are set forth in the following description and in FIGS. 1–7 to provide a thorough understanding of such embodiments. One skilled in the art, however, will understand that the present invention can have additional embodiments and can be practiced without several of the details described in the following description.

Figure 1:
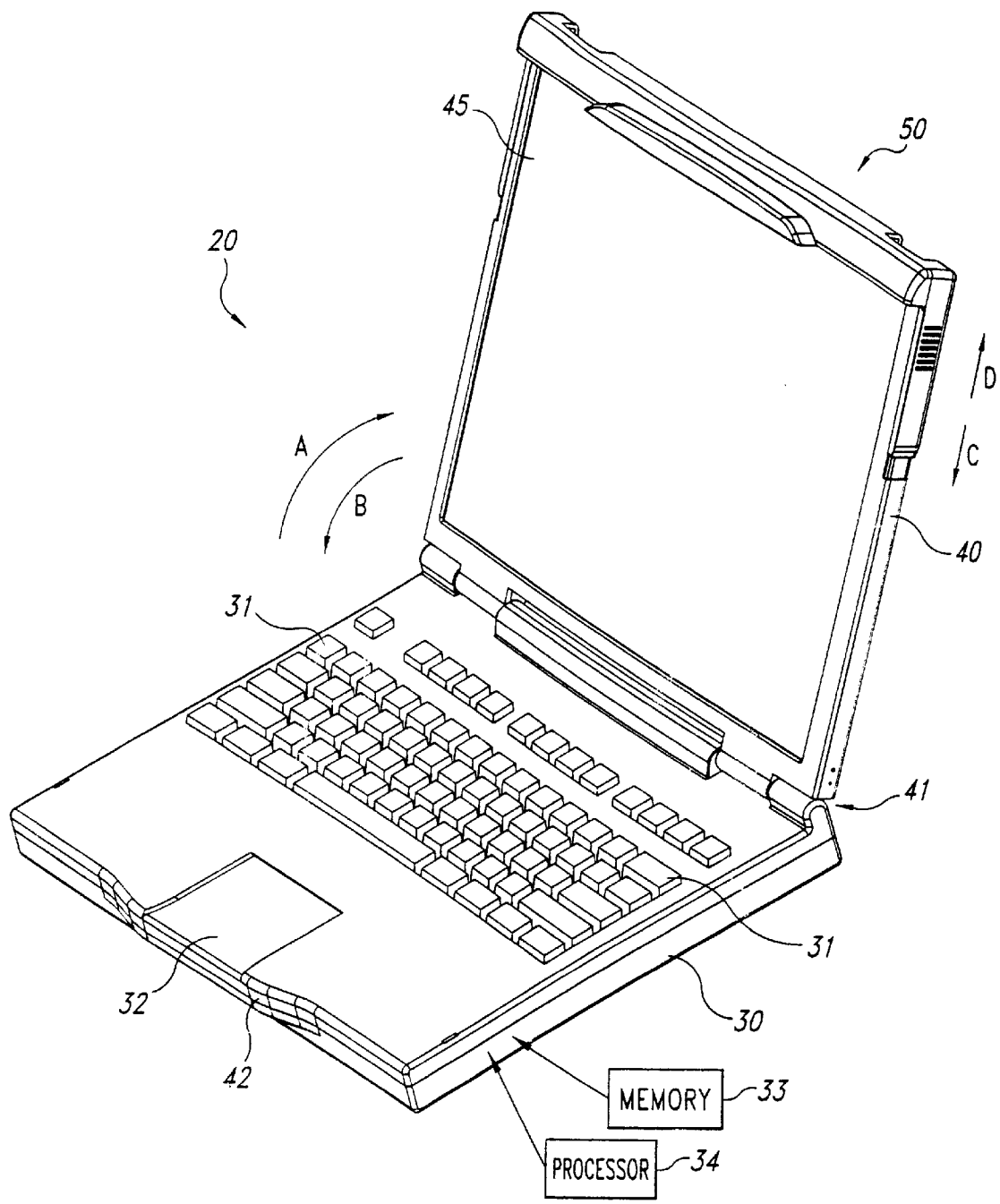
FIG. 1 is a top isometric view of a laptop computer having an oversized display housing that can be releasably latched to a base of the laptop computer in accordance with an embodiment of the invention.

FIG. 1 is a top isometric view of a laptop computer 20 having a display housing 40 pivotably coupled to a base 30 by a pivot joint 41. The base 30 can include a plurality of input keys 31 and a touch pad 32 or other input device, such as a roller ball, mouse or joystick. The base can further include a memory 33 and a processor 34, both shown schematically in FIG. 1. The display housing 40 can include a display 45, such as an LCD screen, a field emission display or another visually accessible display device. The display housing 40 can be pivoted away from the base 30 to an unstowed position (arrow A), and it can be pivoted toward the base 30 to a stowed position (arrow B).

The display housing 40 can also include a latch 50 to releasably secure the display housing 40 to the base 30. For example, when the display housing 40 is in the stowed position, the latch 50 can be translated toward the pivot joint 41 (arrow C) to engage a corresponding projection 42 of the base 30 and secure the display housing 40 to the base 30. The latch 50 can also be translated in the opposite direction (arrow D) to release the display housing 40 from the base 30 and allow the display housing 40 to be pivoted to the unstowed position.

Figure 2:
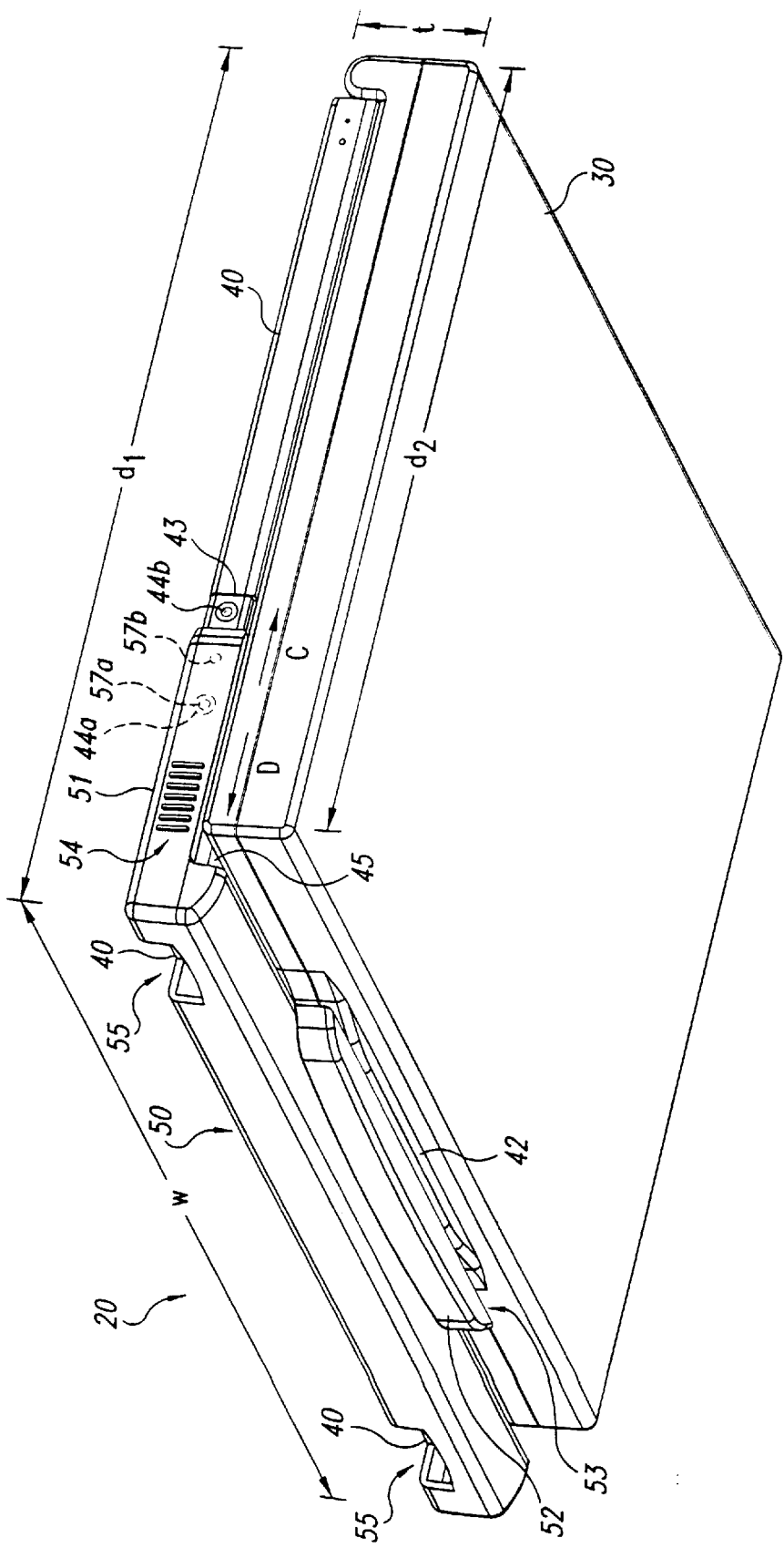
FIG. 2 is a bottom isometric view of the computer of FIG. 1 with the display housing folded toward the base.

FIG. 2 is a bottom isometric view of the laptop computer 20 shown in FIG. 1. The laptop computer 20 has an overall width w, an overall depth $d_1$, and an overall thickness t. As shown in FIG. 2, the overall depth $d_1$ is also the depth of the display housing 40, and exceeds a depth $d_2$ of the base 30 so that a forward portion of the display housing 40 overhangs the base 30. In other embodiments, other portions of the display housing 40 can overhang other portions of the base 30 (e.g., side or rear portions of the base 30).

In one embodiment, the latch 50 includes an attachment portion 51 slidably coupled to the overhanging forward portion of the display housing 40. For example, the attachment portion 51 can be configured to slide along a guide rail 43 of the display housing 40 between an unsecured position (shown in FIG. 2) and a secured position. The attachment portion 51 can include a locking device to hold the latch 50 in the secured position and/or the unsecured position. For example, the locking device can include two detents 57 (shown in FIG. 2 as a forward detent 57a and a rear detent 57b) that engage corresponding detent apertures 44 (shown as a forward detent aperture 44a and a rear detent aperture 44b) on the guide rail 43. When the forward detent 57a is received in the forward detent aperture 44a, the latch 50 is releasably held in the unsecured position (shown in FIG. 2). When the rear detent 57b is received in the rear detent aperture 44b, the latch 50 is releasably held in the secured position.

The attachment portion 51 can further include finger grips 54 (one of which is shown in FIG. 2) having ribs or other texture elements to engage a user's fingers (not shown). The attachment portion 51 can also have access openings 55 through which the display housing 40 is accessible. Users can engage the display housing 40 through the access openings 55 with the thumbs of each hand while engaging the finger grips 54 with the index fingers of each hand. The users can then draw their index fingers toward them to move the latch 50 in the direction indicated by arrow D from the secured position to the unsecured position. In other embodiments, users can use other fingers to manipulate the latch 50.

The latch 50 can further include an engaging portion 52 that engages the base 30 when the latch 50 is in the secured position. In one embodiment, the engaging portion 52 includes a cavity 53 configured to receive the protrusion 42 of the base 30 when the latch 50 is moved in the direction indicated by arrow C from the unsecured position (shown in FIG. 2) to the secured position. In other embodiments, the engaging portion 52 can have other configurations, as will be discussed in greater detail below with reference to FIGS. 3–7.

Operation of an embodiment of the laptop computer 20 is best understood with reference to FIGS. 1 and 2. Beginning with FIG. 2, users can disengage the display housing 40 from the base 30 by contacting the display housing 40 through the access openings 55 of the latch 50. Users can then slide the latch 50 in the direction indicated by arrow D, as discussed above, until the engaging portion 52 disengages from the protrusion 42. At this point, the forward detent 57a is received in the forward detent aperture 44a to prevent users from inadvertently moving the latch 50 away from the unsecured position.

Referring now to FIG. 1, users can pivot the display housing 40 (arrow A) to its unstowed position to view the display 45 and access the input keys 31 and input device 32. When the display housing 40 is moved to its unstowed position and the latch 50 is moved to its unsecured position, the latch 50 does not overlap the display 45, so that the entire display 45 is accessible for viewing.

To stow and secure the display housing 40, users can pivot the display housing 40 toward the base 30 (arrow B). Once the display housing 40 is folded flat against the base 30 (FIG. 2), users can slide the latch 50 in the direction indicated by arrow C until the cavity 53 receives the protrusion 42 and the rear detent aperture 44b receives the rear detent 57b. When the latch 50 secures the display housing 40 to the base 30 in the stowed position, the display housing 40 cannot be easily pivoted away from the base 30. Furthermore, when the latch 50 is in the secured position, it can cover the portion of the display 45 that overhangs the base 30.

One advantage of the laptop computer 20 shown in FIGS. 1 and 2 is that the latch 50 can easily secure the display housing 40 to the base 30 even though the oversized display housing 40 overhangs the base 30. Moreover, because the latch 50 can be movably attached directly to the overhanging portion of the display housing 40, another advantage is that the latch 50 can cover the portion of the display 45 overhanging the base 30 to protect the display 45 when the display housing 40 is in the stowed position. Furthermore, when the latch 50 is moved to the unsecured position, it does not obstruct the display 45, allowing the user to take full advantage of the increased size of the display 45.

Still a further advantage is that the latch 50 can include detents 57 to hold the latch 50 in either the secured position or the unsecured position. This is advantageous because it reduces the likelihood that the latch 50 will inadvertently slip from the unsecured position to a position where it can obscure a portion of the display 45. In addition, the detents 57 reduce the likelihood that the latch 50 will slip from the secured position, which may cause the laptop computer 20 to inadvertently open.

Yet another advantage is that the latch 50 can include access openings 55 that allow users to more easily move the latch 50 from the secured position to the unsecured position. For example, because users can brace their fingers against the display housing 40 by contacting the display housing 40 through the access openings 55, the users can more readily move the latch 55 relative to the display housing 40.

Figure 3:
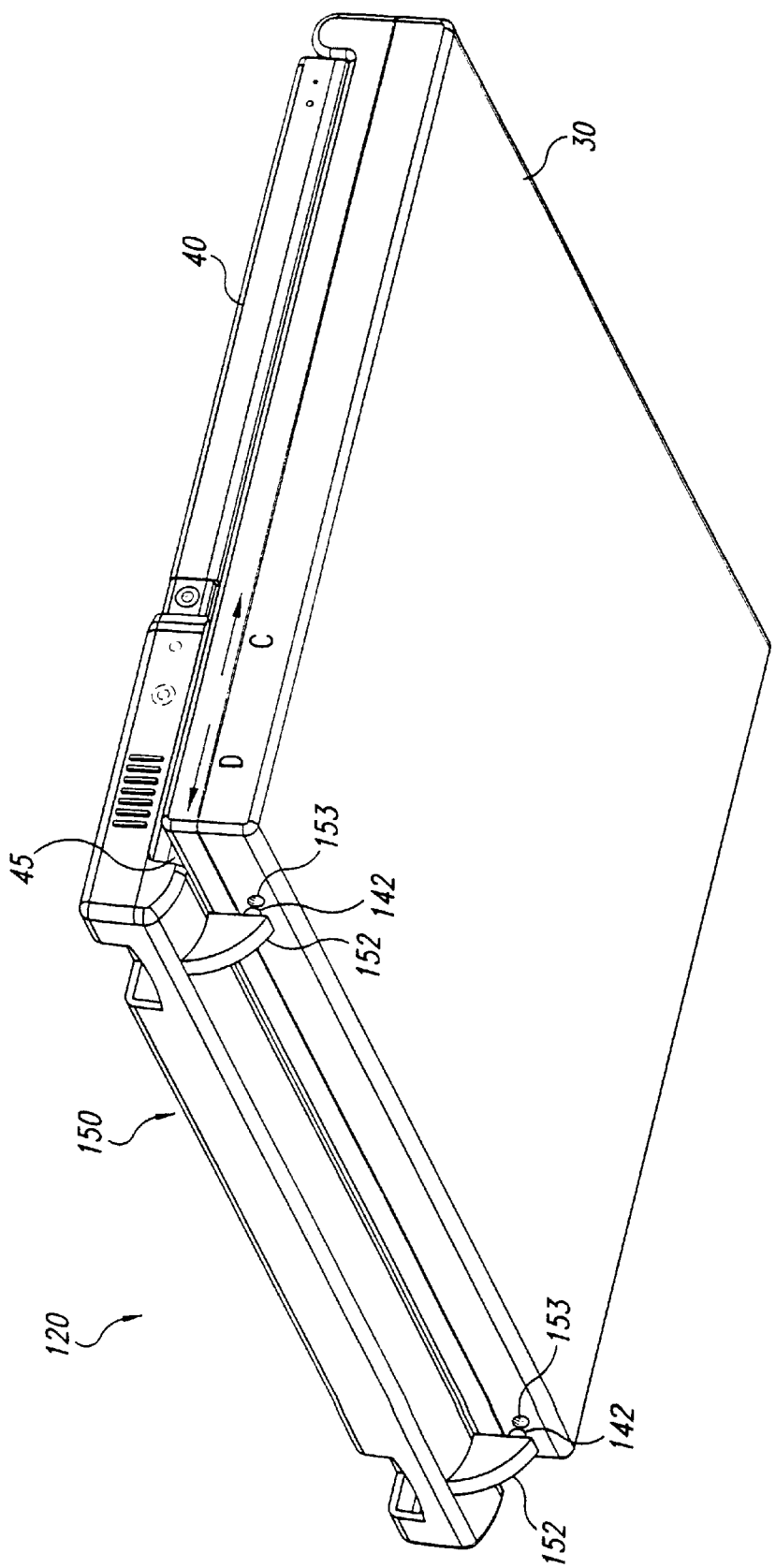
FIG. 3 is a bottom isometric view of a laptop computer having an oversized display housing releasably secured to a base in accordance with another embodiment of the invention.

FIG. 3 is a bottom isometric view of a laptop computer 120 having a latch 150 with two engaging portions 152 in accordance with another embodiment of the invention. As is shown in FIG. 3, each engaging portion 152 includes a projection 142 that can be removably inserted into a corresponding cavity 153 of the base 30. Accordingly, the latch 150 can be translated away from the base 30 (arrow D) to move the latch 150 to the unsecured position. When in the unsecured position, the projections 142 are disengaged from the corresponding cavities 153 and the display 45 can be pivoted away from the base 30. The latch 150 can also be translated toward the base 30 (arrow C) to the secured position to secure the display housing 40 to the base 30 in the stowed position.

Figure 4:
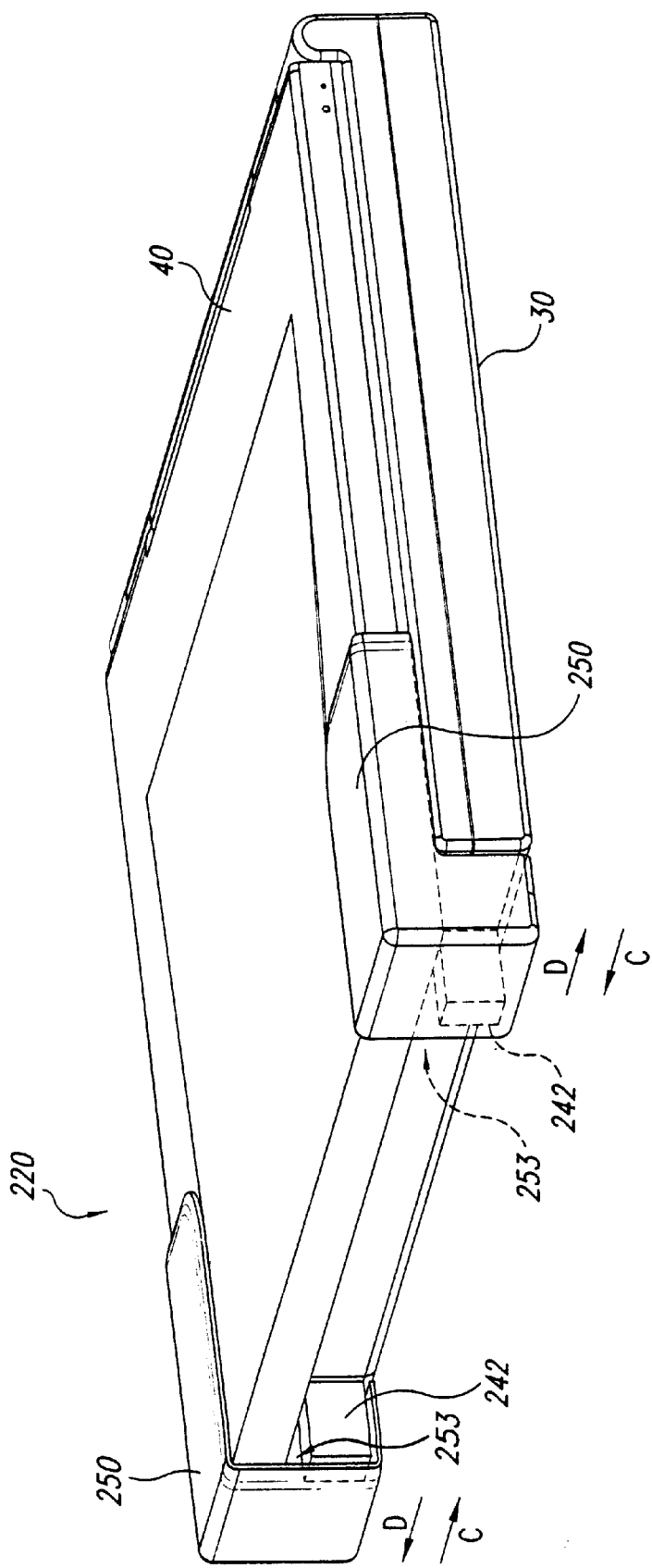
FIG. 4 is a top isometric view of a laptop computer having an oversized display housing releasably secured to a base in accordance with still another embodiment of the invention.

FIG. 4 is a top isometric view of a laptop computer 220 having two latches 250 that slide transversely in accordance with another embodiment of the invention. As shown in FIG.

4, each of the latches 250 can include a cavity 253 that removably receives a corresponding projection 242 of the base 30. When the latches 250 are in the secured position (shown in FIG. 4), the projections 242 are received in the cavities 253. To move the latches 250 to their unsecured positions, users can slide the latches away from the base 30 (arrow D) until the projections 242 are clear of the cavities 253. At that point, the display housing 40 can be pivoted away from the base 30 to operate the computer.

An advantage of the laptop computer 220 shown in FIG. 4 is that the latches 250 may be smaller, and therefore less costly to manufacture than the latches 50 and 150 shown in FIGS. 1–3. Conversely, an advantage of the latches 50 and 150 shown in FIGS. 1–3 is that they extend across the entire width w (FIG. 2) of the laptop computer to protect the display 45 (FIGS. 1–3) when the display housing 40 is in the stowed position.

Figure 5A:
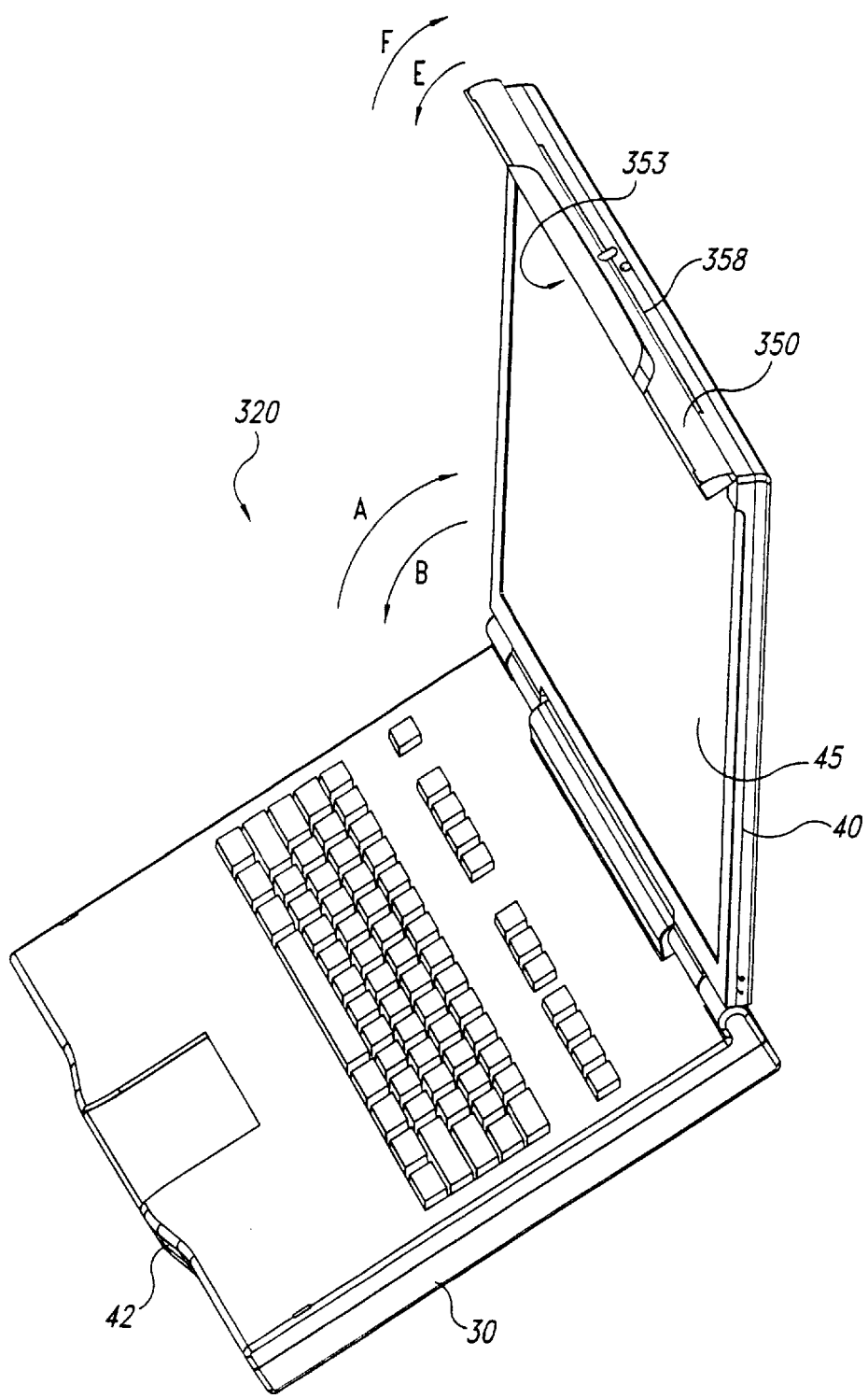
FIG. 5A is a top isometric view of a laptop computer having an oversized display housing with a pivotal latch that releasably secures the display housing to a base of the laptop computer in accordance with yet another embodiment of the invention.

FIG. 5A is a top isometric view of a laptop computer 320 having a latch 350 that pivots between the secured position and the unsecured position in accordance with yet another embodiment of the invention. In one embodiment, the latch 350 is pivotably connected to a forward edge of the display housing 40 with a latch pivot 358. The latch 350 can be pivoted relative to the display housing 40 and away from the base 30 (arrow F) to the unsecured position to expose the display 45. The latch 350 can be pivoted in the opposite direction toward the base 30 (arrow E) to secure the display housing 40 to the base 30.

Figure 5B:
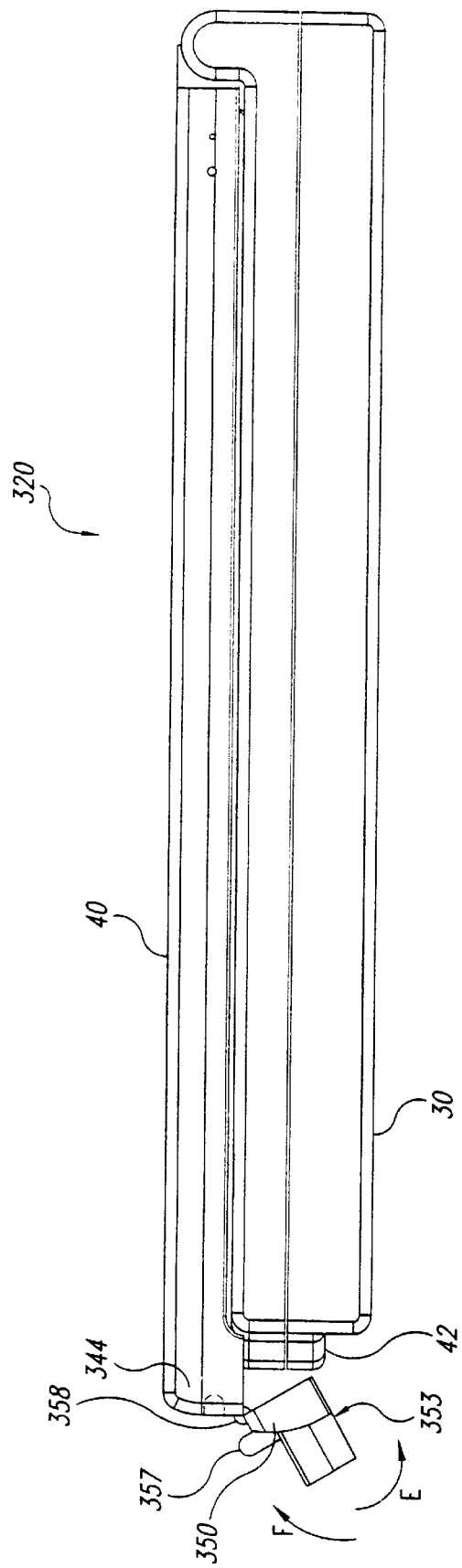
FIG. 5B is a side elevation view of the laptop computer shown in FIG. 5A with the display housing folded toward the base.

FIG. 5B is a side elevation view of the laptop computer 320 shown in FIG. 5A. As shown in FIG. 5B, the display housing 40 is folded against the base 30 in the stowed position, and the latch 350 is shown in transition between the unsecured position and the secured position. In one embodiment, the latch 350 can include a cavity 353 that removably receives the projection 42 of the base 30 when the latch 350 is in the secured position. In a further aspect of this embodiment, walls of the cavity 353 can be configured to frictionally engage the projection 42 so that the latch 350 is not inadvertently pivoted away from the secured position. In still a further aspect of this embodiment, the latch 350 can include a detent 357 that is removably received in a detent aperture 344 when the latch 350 is moved to the unsecured position. Accordingly, the latch 350 can be prevented from inadvertently rotating in front of the display 45 (FIG. 5A) where it might obscure visibility of the display 45.

Figure 6:
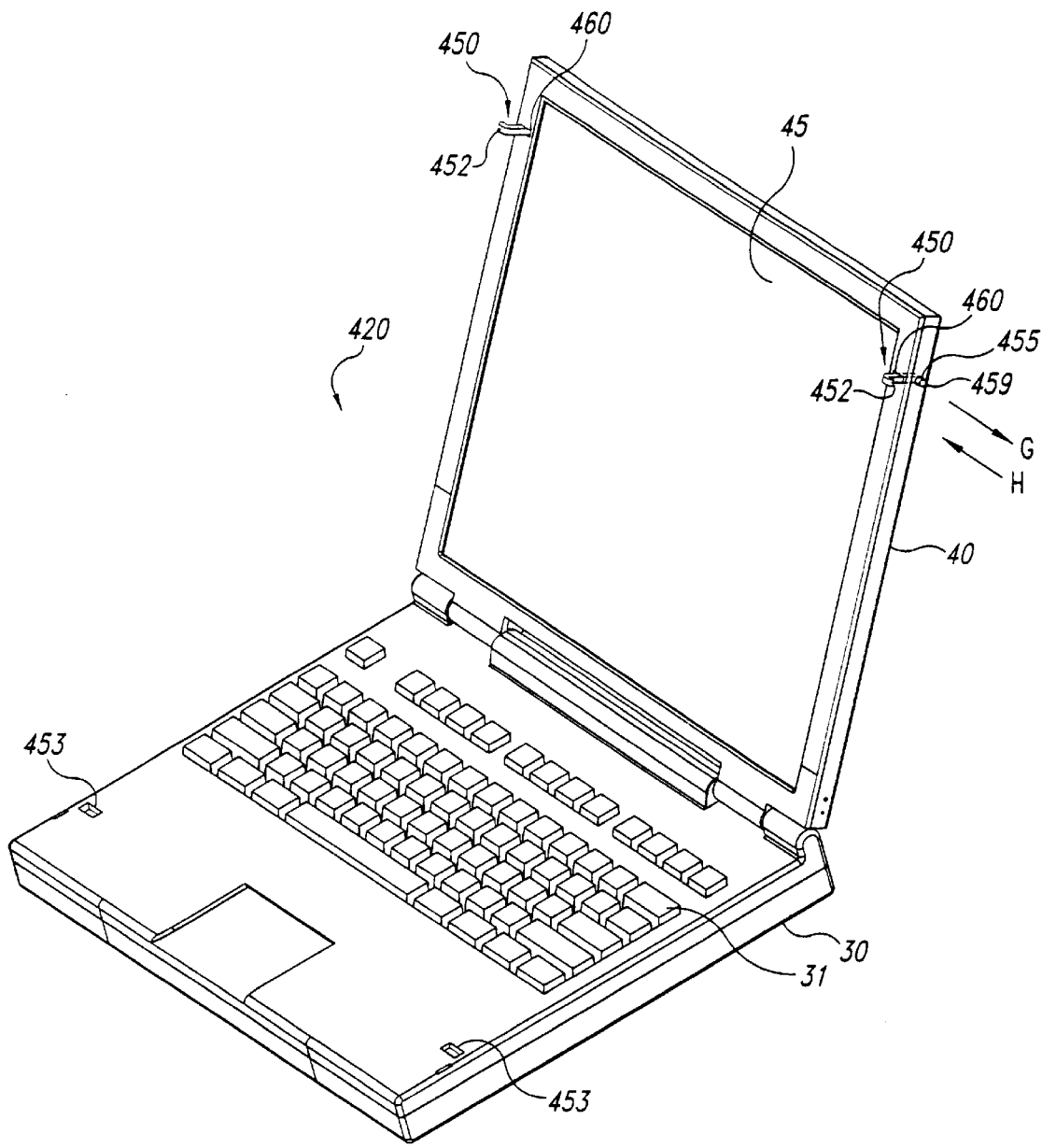
FIG. 6 is a top isometric view of a laptop computer having an oversized display housing that can be releasably secured to a base with a latch in accordance with still another embodiment of the invention.

FIG. 6 is a top isometric view of a laptop computer 420 in accordance with another embodiment of the invention having a pair of latches 452 in the display housing 40 that can be received in a corresponding pair of cavities 453 in the base 30. In one aspect of the embodiment shown in FIG. 6, each latch 450 can include a hook-shaped engagement portion 452 that slides transversely in a slot 460 of the display housing 40. When the latch 450 is in the secured position, the hook-shaped engagement portion 452 engages the walls of the corresponding cavity 453.

Each engagement portion 452 can be coupled to a contact portion 459 that is in turn accessible to users through an access opening 455 in the display housing 40. When users press the contact portions 459 inward (arrow H), the engagement portions 452 move inwardly into the display housing 40 to the unsecured position. When users release the contact portions 459, the engagement portions 452 slide outwardly with respect to the display housing 40 (arrow G). Accordingly, when the display housing 40 is closed against the base 30, the engagement portions 452 other latches 450 can hook under the top panel of the base 30 in the secured position. In one embodiment, the latches 450 can be spring-loaded or otherwise biased toward the secured position.

Figure 7:
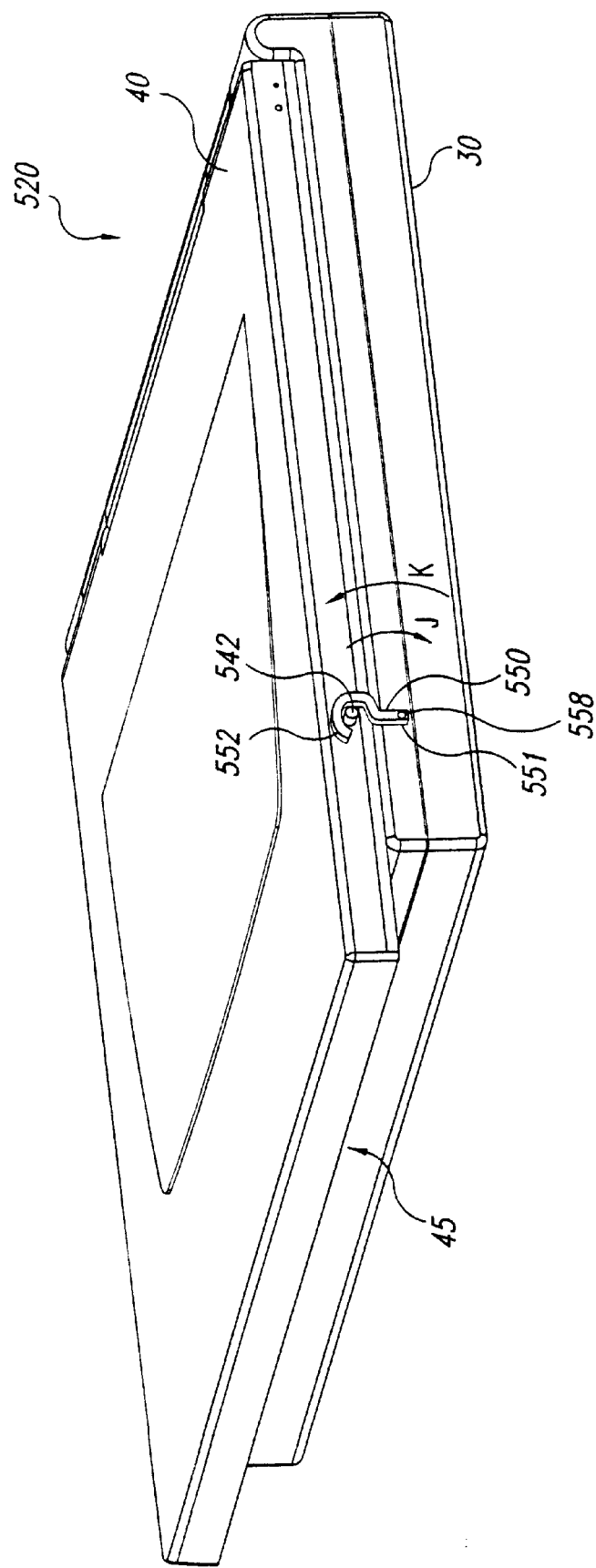
FIG. 7 is a top isometric view of a laptop computer having an oversized display housing secured to a base with a latch in accordance with yet another embodiment of the invention.

FIG. 7 is a side isometric view of a laptop computer 520 having a pair of latches 550 (one of which is shown in FIG. 7) in accordance with still another embodiment of the invention. As shown in FIG. 7, each latch 550 can include an attachment portion 551 that is pivotally attached to the base 30 with a latch pivot pin 558 to allow the latch 550 to rotate relative to the display housing 40 (arrows J and K). Each latch 550 can further include an engaging portion 552 that is configured to releasably engage a corresponding projection 542 extending away from the display housing 40. When the latch 550 is rotated in the direction indicated by arrow K, the engaging portion 552 engages the projection 542 and secures the display housing 40 to the base 30. When the latch 550 is rotated in the direction indicated by arrow J, the engaging portion 552 releases the projection 542 and the display housing 40 can be moved to the unstowed position.

In one aspect of this embodiment, the engaging portion 552 can have a hook shape to releasably engage the projection 542. In still a further aspect of this embodiment, the engaging portion 552 can include an elastic, resilient material that can be elastically deformed to snap over and around the projection 542 to position the latch 550 in the secured position. The engaging portion 552 can be similarly elastically deformed to move the latch 550 away from the projection to the unsecured position.

An advantage of the latch 550 shown in FIG. 7 is that it does not depend from the display housing 40, and accordingly may be less likely to block any portion of the display 45. Conversely, an advantage of the latches that depend from the display housing 40, for example, the latches shown in FIGS. 1–2 and 5A–5B, is that they can cover and protect the overhanging portion of display 45 when the latches are in the secured position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for operating a display housing of a laptop computer relative to a base of the laptop computer comprising:

stowing the display housing by folding the display housing toward the base to extend an overhanging rim portion of the display housing beyond an edge of the base; and releasably securing the overhanging rim portion of the display housing to the base.

2. The method of claim 1, further comprising:

releasing the overhanging rim portion of the display housing from the base;

folding the display housing away from the base to access a display of the display housing.

3. The method of claim 2 wherein releasing the overhanging rim portion of the display housing from the base includes rotating a latch member away from one of the display housing and the base to disengage the latch member from the one of the display and the base.

4. The method of claim 2 wherein releasing the overhanging rim portion of the display housing from the base includes rotating a latch member of one of base and display housing to disengage the latch member from a corresponding protrusion of the other of base and display housing.

5. The method of claim 2 wherein releasing the overhanging rim portion of the display housing from the base includes translating a latch member relative to the display housing to disengage the latch member from the base.

6. The method of claim 1 wherein securing the overhanging rim portion of the of the display housing to the base includes rotating a latch member relative to the one of the display housing and the base to engage the latch member with the other of the display housing and the base.

7. The method of claim 1 wherein securing the overhanging rim portion of the display housing to the base includes rotating a latch member of one of base and display housing to engage a corresponding protrusion of the other of base and display housing.

8. The method of claim 1 wherein securing the overhanging rim portion of the display housing to the base includes translating a latch member relative to the display to engage the latch member with the base.

9. A method for operating a display housing of a laptop computer relative to a base of the laptop computer, the display housing having an overhanging rim portion proximate to a forward edge of the display housing, comprising:

stowing the display housing by folding the display housing toward the base to extend the overhanging rim portion of the display housing beyond a forward edge of the base; and releasably securing the display housing to the base.

10. The method of claim 9 wherein releasably securing the display housing includes directly securing the overhanging rim portion of the display housing to the base.

11. The method of claim 9, further comprising:

releasing the display housing from the base; and folding the display housing away from the base to access the display housing.

12. The method of claim 11 wherein releasing display housing from the base includes depressing a latch member inwardly from a surface of display housing to disengage the latch member from the base.

13. The method of claim 11 wherein releasing the display housing from the base includes depressing a portion of a latch member accessible through an aperture of the display.

14. The method of claim 11 wherein releasing the display housing from the base includes rotating a latch member of one of base and display housing to disengage the latch member from a corresponding protrusion of the other of base and display housing.

15. The method of claim 11 wherein releasing the display housing from the base includes translating a latch member relative to the display housing to disengage the latch member from the base.

16. A method for operating a display housing of a laptop computer relative to a base of the laptop computer, comprising:

folding the display housing toward the base to position a forward rim portion of the display housing beyond a forward edge of the base; and releasably securing the display housing to the base by sliding a slidable latching device of the display housing in a first direction relative to the display housing to engage a portion of the base.

17. The method of claim 16, further comprising:

releasing the display housing from the base by sliding the latching device of the display housing in a second direction relative to the display housing to disengage the portion of the base; and folding the display housing away from the base to access a display of the display housing.

18. The method of claim 17 wherein releasing the at least part of the display housing from the base includes:

engaging a latching device of the display housing with a first finger;

inserting a second finger through an access opening of the latching device; and moving the first finger relative to the second finger to slide at least a portion of the latching device away from the display housing and to disengage the latching device from the base.

19. The method of claim 18 wherein engaging the latching device with the first finger includes engaging the latching device with a forefinger and inserting the second finger through the access opening includes inserting a thumb through the access opening.

20. The method of claim 16 wherein releasably securing the display housing to the base includes receiving a protrusion of base in an opening of the latching device.

21. The method of claim 16 wherein releasably securing the display housing to the base includes receiving a protrusion of the latching device in an aperture of base.

22. A method for operating a display housing of a laptop computer relative to a base of the laptop computer, comprising:

folding the display housing toward the base to position a forward rim portion of the display housing beyond a forward edge of the base; and releasably securing the display housing to the base by pivoting a pivotable latching device of the display housing in a first direction relative to the display housing to engage a portion of the base.

23. The method of claim 22, further comprising:

releasing the display housing from the base by pivoting the latching device of the display housing in a second direction relative to the display to disengage portion of the base; and folding the display housing away from the base to access a display of the display housing.

24. The method of claim 22 wherein releasably securing the display housing to the base includes receiving a protrusion of base in an opening of the latching device.

25. The method of claim 22 wherein releasably securing the display housing to the base includes receiving a protrusion of the latching device in an aperture of base.

26. A method for operating a display housing of a laptop computer relative to a base of the laptop computer, comprising:

folding the display housing toward the base to position a forward rim portion of the display housing overhanging beyond a forward edge of the base;

releasably securing the display housing to the base by sliding a slidable latching device of the display housing in a first direction relative to the display housing to engage a portion of the base;

releasing the display housing from the base by sliding the latching device of the display housing in a second direction relative to the display housing to disengage the portion of the base, wherein releasing the display housing from the base includes engaging a latching device of the display housing with a first finger, inserting a second finger through an access opening of the latching device, and moving the first finger relative to the second finger to slide at least a portion of the latching device away from the display housing; and folding the display housing away from the base to access a display of the display housing.

* * * * *